(12) United States Patent
Nakarmi et al.

(10) Patent No.: US 11,706,328 B2
(45) Date of Patent: Jul. 18, 2023

(54) METHOD AND USER EQUIPMENT FOR DETECTING A POTENTIALLY FRAUDULENT CALL

(71) Applicant: Telefonaktiebolaget LM Ericsson (publ), Stockholm (SE)

(72) Inventors: Prajwol Kumar Nakarmi, Sollentuna (SE); Luis Barriga, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/287,780

(22) PCT Filed: Oct. 25, 2019

(86) PCT No.: PCT/SE2019/051054
§ 371 (c)(1),
(2) Date: Apr. 22, 2021

(87) PCT Pub. No.: WO2020/085989
PCT Pub. Date: Apr. 30, 2020

(65) Prior Publication Data
US 2021/0385320 A1    Dec. 9, 2021

Related U.S. Application Data

(60) Provisional application No. 62/750,899, filed on Oct. 26, 2018.

(51) Int. Cl.
*H04M 1/663*      (2006.01)
*H04W 12/128*     (2021.01)
*H04W 12/122*     (2021.01)

(52) U.S. Cl.
CPC ......... *H04M 1/663* (2013.01); *H04W 12/122* (2021.01); *H04W 12/128* (2021.01)

(58) Field of Classification Search
CPC ......... H04M 1/663; H04M 2203/6027; H04M 3/436; H04M 15/47; H04W 12/128; H04W 12/12
See application file for complete search history.

(56) References Cited

U.S. PATENT DOCUMENTS

| | | | |
|---|---|---|---|
| 8,565,396 B1 * | 10/2013 | Oliver | H04M 1/663 379/144.03 |
| 8,654,946 B1 * | 2/2014 | Patro | H04M 3/02 455/414.1 |

(Continued)

FOREIGN PATENT DOCUMENTS

| | | |
|---|---|---|
| CN | 101262520 A | 9/2008 |
| CN | 101800947 A | 8/2010 |

(Continued)

OTHER PUBLICATIONS

International Search Report and Written Opinion issued in International Application No. PCT/SE2019/051054 dated Jan. 31, 2020 (12 pages).

(Continued)

*Primary Examiner* — Minjung Kim
(74) *Attorney, Agent, or Firm* — Rothwell, Figg, Ernst & Manbeck, P.C.

(57) ABSTRACT

A method and a User Equipment, UE (120) for detecting that the UE has received a fraudulent missed call, e.g. from a non-legitimate device (150). When receiving a missed call which is ended before a user of the UE has answered the incoming call, the UE determines the duration of the missed call, and indicates, e.g. to a user of the UE, the 5 duration of the missed call. The missed call may be determined as potentially fraudulent if the duration of the missed call is below or equal to a predetermined threshold.

15 Claims, 10 Drawing Sheets

(56) References Cited

U.S. PATENT DOCUMENTS

| | | | | |
|---|---|---|---|---|
| 10,951,756 B1* | 3/2021 | Silverstein | ............ | H04M 3/436 |
| 2006/0072726 A1* | 4/2006 | Klein | ................ | H04M 3/42263 |
| | | | | 379/211.01 |
| 2014/0192965 A1* | 7/2014 | Almeida | ............. | H04M 3/2281 |
| | | | | 379/70 |
| 2017/0094061 A1* | 3/2017 | Tu | ........................... | H04W 4/16 |
| 2018/0309801 A1 | 10/2018 | Rathod | | |
| 2020/0322483 A1* | 10/2020 | Anand | .................. | H04M 3/543 |
| 2021/0274040 A1* | 9/2021 | Bouvet | ................ | H04M 3/436 |

FOREIGN PATENT DOCUMENTS

| | | | | | |
|---|---|---|---|---|---|
| CN | 102196085 | A | * | 9/2011 | |
| CN | 102196085 | A | | 9/2011 | |
| CN | 102421076 | A | | 4/2012 | |
| CN | 102917133 | A | * | 2/2013 | |
| CN | 102917133 | A | | 2/2013 | |
| CN | 104378488 | A | | 2/2015 | |
| CN | 108243049 | A | | 7/2018 | |
| EP | 3 214 861 | A1 | | 9/2017 | |
| EP | 3214861 | A1 | * | 9/2017 | ............ H04M 15/47 |
| EP | 3 267 668 | A2 | | 1/2018 | |
| KR | 20120001284 | A | | 1/2012 | |
| WO | WO-2015014250 | A1 | * | 2/2015 | ...... H04M 1/274516 |

OTHER PUBLICATIONS

3GPP TS 24.628 V15.0.0 (Jun. 2018), 3rd Generation Partnership Project; Technical Specification Group Core Network and Terminals; Common Basic Communication procedures using IP Multimedia (IM) Core Network (CN) subsystem; Protocol specification (Release 15), Jun. 2018 (60 pages).

* cited by examiner

US 11,706,328 B2

METHOD AND USER EQUIPMENT FOR DETECTING A POTENTIALLY FRAUDULENT CALL

CROSS REFERENCE TO RELATED APPLICATION(S)

This application is a 35 U.S.C. § 371 National Stage of International Patent Application No. PCT/SE2019/051054, filed on Oct. 25, 2019, which claims priority to U.S. provisional patent application No. 62/750,899, filed on Oct. 26, 2018. The above identified applications are incorporated by this reference.

TECHNICAL FIELD

Embodiments herein relate to a method and a User Equipment (UE) for detecting that the UE has received a potentially fraudulent missed call.

BACKGROUND

Every day communication networks establish a tremendous amount of voice calls and messages through complex interconnection technologies where communicating parties, which may herein be referred to as a caller and a "callee", may be located anywhere in the world. The caller is the party which the call originates from while the callee is the party receiving the call. The callee may thus also be referred to as the receiver of the call. Traditionally, voice calls have been established over a Public Switched Telephone Network (PSTN), but over time, PSTNs have been replaced by mobile networks based on standards such as 3rd Generation Partnership Project (3GPP) standards or Code Division Multiple Access (CDMA) standards where text messaging, which is also referred to as Short Message Service (SMS), is also possible. In parallel, the Internet may also be used for cheaper Voice over IP (VoIP) and messaging services running over wired/wireless networks.

FIG. 1 discloses a simplified mobile network. Mobile networks standardized by 3GPP are the most popular global wireless networks. There are several generations of these mobile networks, such as e.g. second generation (2G), third generation (3G), fourth generation (4G), and fifth generation (5G), where 5G is the latest generation. On a very high level, mobile networks standardized by 3GPP can be said to comprise of a user equipment (UE), a radio access network (RAN), and a core network (CN), see FIG. 1. The UE is typically a mobile device used by a user to wirelessly access the network. The RAN comprises of base stations which are responsible for providing wireless radio communication to the UE and for connecting the UE to the core network. The CN comprises of several types of core network functions which are responsible for various functions such as handling mobility of the UE, interconnecting to data network, packet routing and forwarding, among other responsibilities.

A commonly used business model of mobile networks may be as follows.

Mobile networks are operated, and their services are offered to the user of the communication service by the so-called mobile network operators (MNOs), also referred to as Communication Services Providers (CSP). In order to use a particular mobile network offered by a particular MNO, the user is required to have a contractual relationship with that particular MNO. Such a relationship is generally referred to as a subscription.

In simple terms, the business model may work as follows. The MNOs provide services to the users that have valid subscriptions. These users use the services, such as e.g., sending short messages often referred to as SMS or text, making phone calls, and/or getting internet access. The MNOs charge these users for the services they have used through the MNOs' billing or charging systems. The users pay according to the billed amount, which may be based on traffic data volumes, time volumes, roaming or flat monthly rates with maximum quotas on data volume and time.

While voice and messaging services are becoming cheaper or even free of charge for callers and callees, there are still certain classes of calls and messages that provide services at higher cost/charge, which are typically referred to as premium services. In other words, when using premium services, e.g. a premium service call, the caller pays a higher rate per minute in exchange of a paid service. The premium service might be offering various services like funny jokes, stories, horoscope, etc.

FIG. 2 discloses an example of how a revenue for a premium service is typically shared between involved parties. In the example shown in FIG. 2, the caller, which is illustrated by a UE 200, such as e.g. a mobile phone is originating a call from its MNO's network to a Premium Service located in another MNO's network. The MNO network of the caller is herein illustrated as Operator A, a cloud, and a base station 202, the premium service 204 is accessed through the other MNO which is similarly illustrated as Operator B, a cloud, and a base station in the right part of FIG. 2. After the call has been completed the billing and revenue sharing may be done as follows. The caller may be billed for 5.30$ by the callers own Operator A, such as the operator with which the caller has the subscription. The Operator A may keep 0.05$ as revenue for its voice service terminated at Operator B via intermediate networks, which are illustrated by two boxes between Operator A and Operator B in FIG. 2. The Operator B may keep 0.25$ as revenue for its service, which might be distributed with intermediate networks. The Premium Service may get most of the payment as revenue, such as e.g. 5.00$. The majority of the total billed amount thus goes to the Premium Service.

A type of fraud called Wangiri may be conducted as follows to fool or "trick" the user to use and pay for the Premium Service so that the payment is collected by a fraudster.

The business model on which mobile networks operate are prone to frauds. Several types of frauds exist and these often cause financial harm to the MNOs or to the users, such as the caller or the callee. Financial harm to the users is mainly caused by fraudsters tricking the users into using a service that brings a substantial share of the billed amount to the fraudsters. In other words, the users may end up paying the billed amount even though they did not intend to use the fraudulent service in the first place.

Due to the significant revenue that premium services may generate, fraudsters are finding fraudulent schemes to attract users to make premium calls using different types of technical and social engineering attacks.

One type of such a fraud is known as the "Wangiri" fraud in which fraudsters make a call to a user, which may herein also be referred to as a victim user, and terminates the call before the user has a chance to answer or accept the call. The fraudsters may e.g. initiate a proper call via the MNO's network or may use a so-called false base station. FIG. 3 discloses an example of a false base station attack. The expression "false base station" shall herein be interpreted as a device in general that impersonates a genuine base station of the users MNO making the UE connect to the false base station 300 instead of to a base station of the legitimate network, see FIG. 3. The false base station may also be referred to as a non-legitimate device. The capabilities of such a false base station may vary depending on whether the mobile network is 2G, 3G, 4G, or 5G network. The 3G, 4G, and 5G mobile networks are resilient to several types of attacks from false base stations that 2G networks were susceptible to. In 2G mobile networks, false base stations can in principle impersonate a complete network and perform various activities like sending faked SMS and calls to the UE.

The main goal of the Wangiri fraud is to manage to leave a missed call notification on a victim users UE. When being curious about the missed call, the user will most likely call back or send an SMS to the number of the missed call. The calling number from which the missed call came would be a telephone number managed by the fraudsters and is typically belonging to a premium service. Therefore, when the victim user calls back or sends an SMS to the premium service number, the user will be billed for the service that the user did not intend to use. In other words, the victim user has been tricked to use the premium service by the fraudsters. These premium service numbers belonging to fraudsters are also known as International Revenue Sharing Fraud (IRSF) numbers.

The above-described Wangiri fraud may also be referred to as "one ring and cut", or "one ring and drop".

In general, premium services are not illegal as such and operators are not allowed to block access to them, unless the premium service violate certain legislation. Moreover, users have the ultimate responsible for calls initiated by themselves, something which cannot be disputed in court. Hence, it is a problem to prevent victim users from getting tricked by the Wangiri fraud to call back a number of a missed call which may lead to a premium service or other function controlled or owned by a fraudster.

SUMMARY

It is an object of embodiments described herein to address at least some of the problems and issues outlined above. It is possible to achieve this object and others by using a method and a User Equipment, UE, as defined in the attached independent claims.

According to one aspect, a method performed by a UE is provided for detecting that the UE has received a fraudulent missed call. When receiving a missed call which is ended before a user of the UE has answered the incoming call, the UE determines the duration of the missed call, and indicates, e.g. to a user of the UE, the duration of the missed call. The missed call may be determined as potentially fraudulent if the duration of the missed call is below or equal to a predetermined threshold.

According to another aspect, a User Equipment, UE is arranged to detect that the UE has received a fraudulent missed call. The UE is configured to receive a missed call which is ended before a user of the UE has answered the incoming call. The UE is also configured to determine the duration of the missed call, and to indicate the duration of the missed call.

The above method and UE have the advantage of enabling more efficient and reliable detection of fraudulent missed calls, and to warn the user of the UE from calling back to the missed telephone number which could otherwise result in extra costs, e.g. if the missed number is related to a premium service or the like associated with a high calling fee.

The above method and UE may be configured and implemented according to different optional embodiments to accomplish further features and benefits, to be described below.

A computer program is also provided comprising instructions which, when executed on at least one processor in the above UE, cause the at least one processor to carry out the method described above. A carrier is also provided which contains the above computer program, wherein the carrier is one of an electronic signal, an optical signal, a radio signal, or a computer readable storage medium.

BRIEF DESCRIPTION OF THE DRAWINGS

Examples of embodiments herein are described in more detail with reference to attached drawings in which.

DETAILED DESCRIPTION

Figure 1:
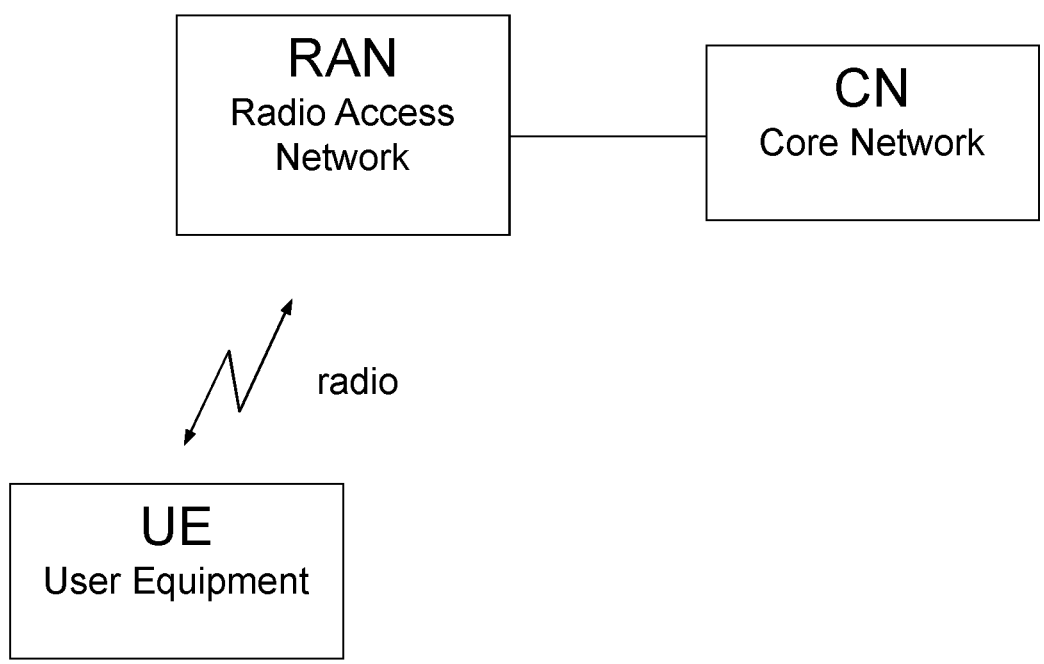
FIG. 1 is a schematic block diagram illustrating a simplified example of a wireless communications network.
Figure 2:
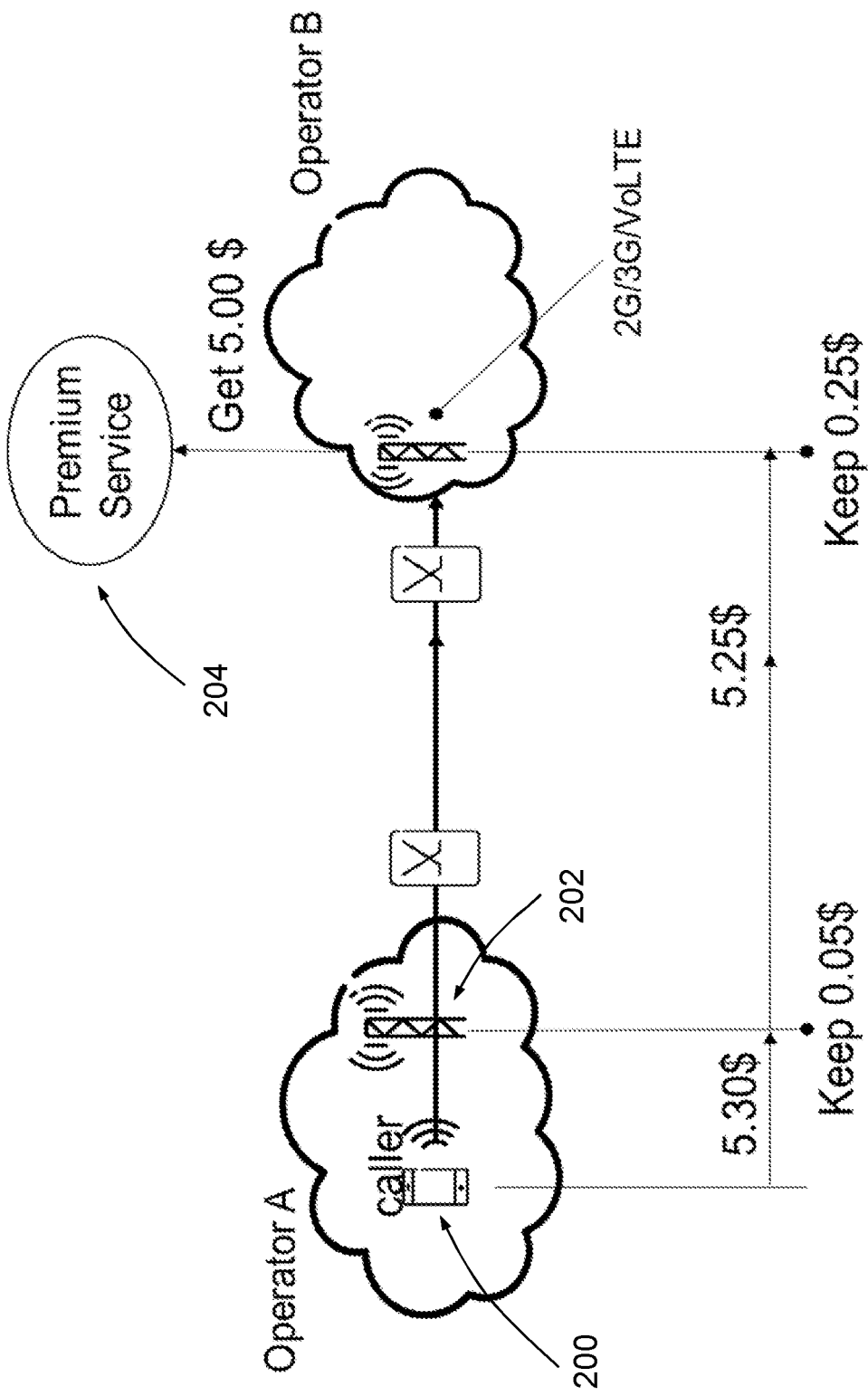
FIG. 2 is a schematic block diagram illustrating how revenue for a premium service is typically shared in a wireless communications network.
Figure 3:
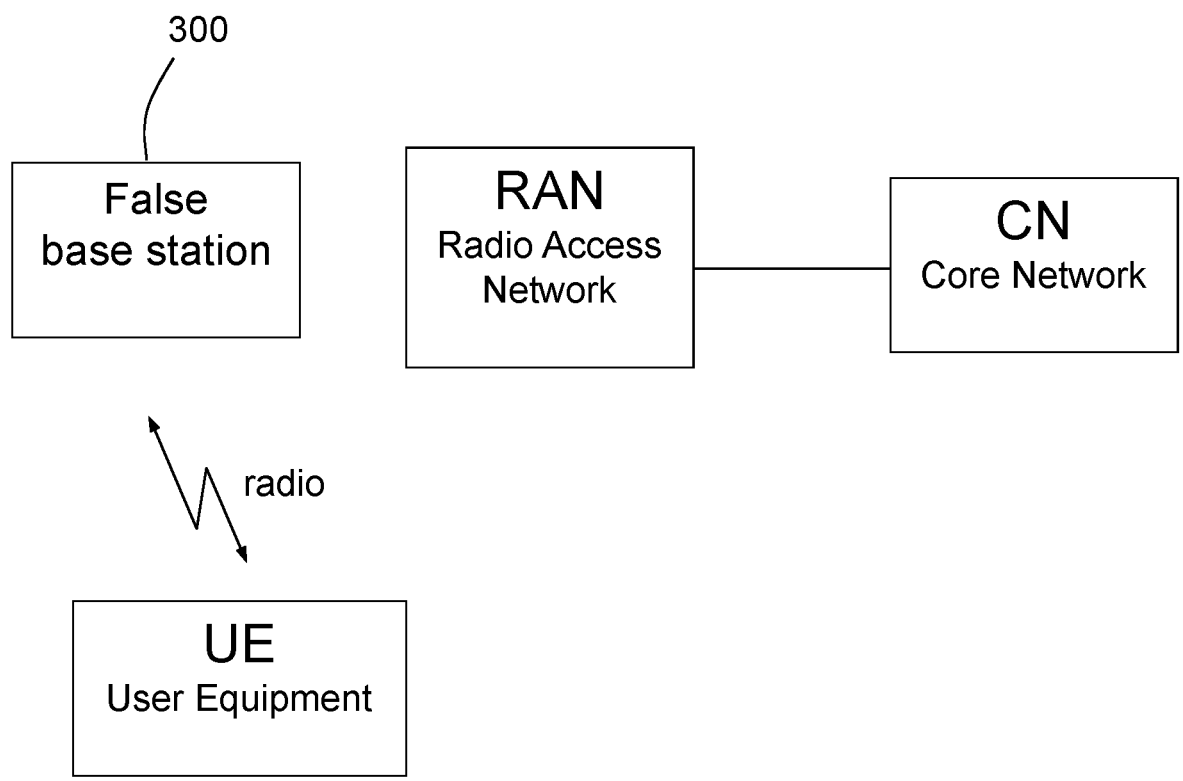
FIG. 3 is a schematic block diagram illustrating how a false base station attack may occur in a wireless communications network.

In some embodiments herein the general term "network node" is used and it may correspond to any type of radio network node or any network node, which communicates with at least a radio network node. Examples of network nodes are any radio network node stated above; a core network node, such as e.g. a Mobile Switching Centre (MSC), a Mobility Management Entity (MME), an Operations & Management (O&M) node, an Operation, Administration and Maintenance (OAM) node, an Operations Support Systems (OSS) node, a Self-Organizing Network (SON) node, a positioning node, such as e.g. an Enhanced Serving Mobile Location Centre (E-SMLC), or a function related Minimization of Drive Tests (MDT) etc.

In some embodiments the non-limiting term network device is used and it refers to any type of wireless device communicating with a network node in a cellular or mobile communication system and being able to perform measurements on other network nodes in a surrounding or tracking area of the network device. Examples of a network device are UE, mobile terminal, target device, device to device UE, machine type UE or UE capable of machine to machine communication, PDA, iPAD, Tablet, mobile terminals, smart phone, Laptop Embedded Equipment (LEE), Laptop Mounted Equipment (LME), USB dongles, radio network node, radio access node etc.

There are several known techniques to combat the above-described Wangiri fraud which will now be briefly discussed.

A first known technique to combat the Wangiri fraud is for the user to simply ignore the missed call. The first technique works, but with serious undesired consequences. Ignoring all the missed calls means that even the genuine missed calls from friends and family are also ignored.

A second known technique is that users are made of aware of the Wangiri fraud, e.g., by informational advertisement, educational marketing etc. Thereby, the user can make an educated guess or use common sense about whether or not to call back to the missed called numbers. The second technique is better that said first technique and may work in some cases. However, it is expensive to provide educational marketing, and even after that, all the users may not have been reached. To make things worse, not all of the users who were reached may understand the threat properly and may not have the skills to make the right judgment regarding whether to call or write back to the missed number.

A third known technique is for the user to call the MNO's customer support in order to decide if they should call back to the number from which a missed call was received. The MNO's customer support may notice that many users are asking about a particular missed call number and may therefore suspect that a Wangiri fraud might have been attempted. Then, the users may receive advice on how to proceed from the MNO's customer support. However, although the third technique may work, it is extremely impractical and costly for MNOs since the number of users for each MNO may range from hundreds of thousands to millions. Furthermore, this solution also causes major inconvenience for users, since they actively have to call the customer support for each missed call.

A fourth known technique is to perform network-based analysis. Generally, in the Wangiri fraud, the fraudsters send missed calls to a large number of users so that at least some of them would call back to the premium service numbers. The network may keep logs of ongoing call initiations and whenever there is a surge in the number of call initiations, the network may suspect that a Wangiri fraud is taking place. The network may also analyze user related data like charging data records or call data records (CDRs). The network may detect that some users have suddenly called a premium number and those users never called to that premium number before. Thereby, the network may suspect that a Wangiri fraud has taken place. The fourth technique may potentially be effective and may work. A disadvantage of this technique is, however, that it is only a detection technique and not a preventive one. Furthermore, the solution is based on a centralized network and there is major effort, technology, and cost associated with such a solution. Furthermore, there is also chance of false positives, meaning that a premium number suspected to be related to the Wangiri fraud may actually be a premium number related to a genuine and noble service that recently became very popular and thus may not be known to the network yet, or some person who is being genuinely called by many friends, or some company that is being genuinely called by many clients.

A fifth technique is to perform network-based control. The network may make a black-list of numbers that are suspected in relation to the Wangiri fraud. The network may then block any calls from the black-listed numbers. The fifth technique may work as a preventive technique, but may come with serious undesired consequences. It is a challenge in itself to obtain a reliable black-list, and there is major effort, technology, and cost associated with doing so. Furthermore, if the black-list is not completely correct (recall false positives), then genuine and noble services, persons, or companies will be denied of calls. Depending upon the regional legislation and service agreement, this technique may be illegal and therefore may not be allowed at all.

A sixth known technique is that a software application or a so-called "app" on the UE supports the user with warnings when the number that has called is black-listed or marked as a premium service number. Such an app may use a database to retrieve information about the black-list or the premium service number. The sixth technique is similar to said fifth technique and may work. It however also has the same disadvantages as said fifth technique. The apps rely on updated databases that fraudsters could manage to avoid detection by using fresh numbers from premium services in foreign countries which the apps may have difficulties to track.

A seventh known technique is that the MNO refrains from paying the premium number services until the MNO is sure that the premium number service is not fraudulent. The seventh technique is kind of reactive and aims at minimizing the amount of total financial loss caused by the Wangiri fraud. It is more of a bureaucratic approach than a technical. Depending on the regional legislation and service agreement, this technique may be illegal and therefore may not be allowable at all.

Figure 4:
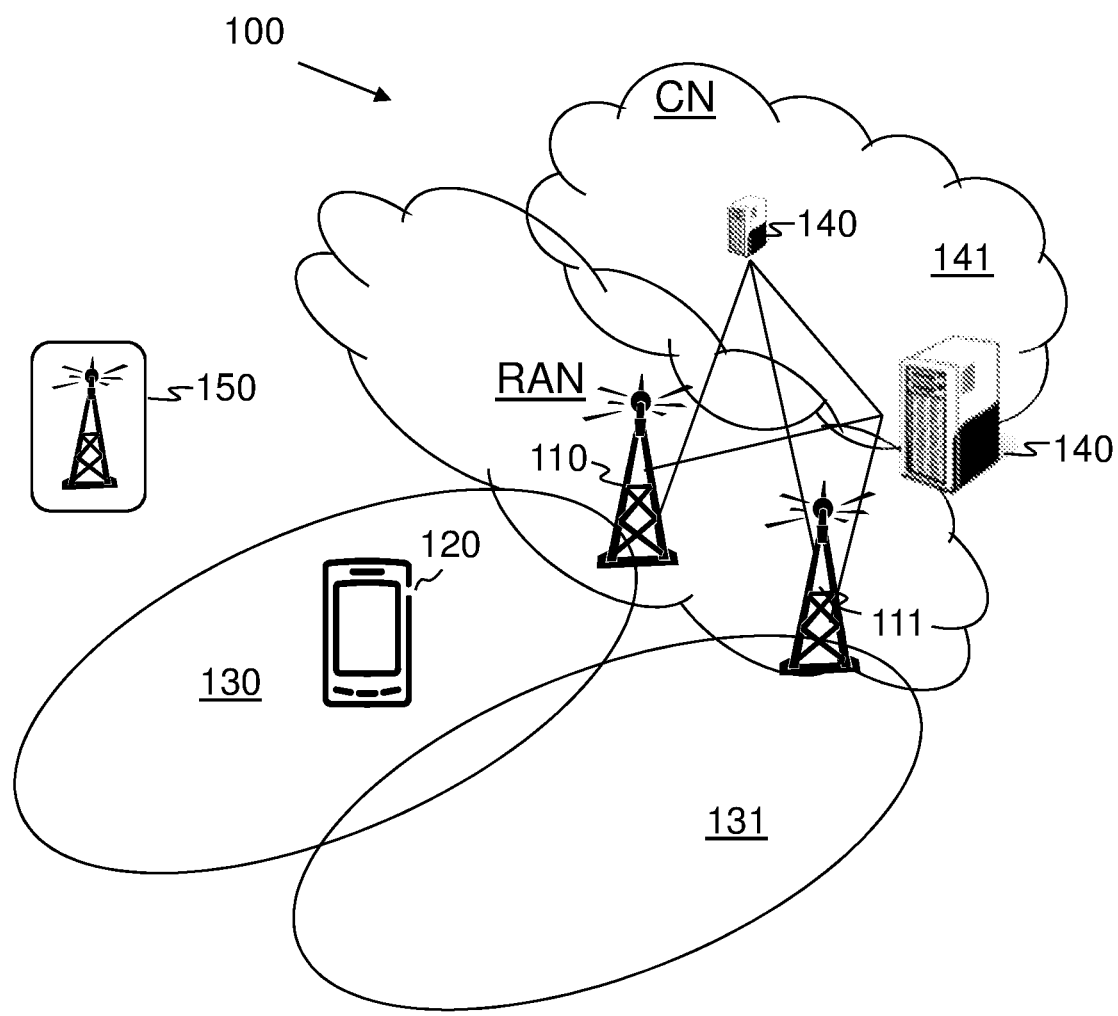
FIG. 4 is a schematic block diagram illustrating an example of a wireless communications network where the embodiments herein may be used.

FIG. 4 depicts an example of a communications network 100 according to a first scenario where the embodiments herein may be implemented. The communications network 100 is in this example a wireless communication network such as e.g. an LTE, E-Utran, WCDMA, GSM network, any 3GPP cellular network, Wimax, or any cellular network or system.

The communications network 100 comprises a Radio Access Network (RAN) and a Core Network (CN). The communication network 100 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. In the communication network 100, one or more UEs 120 may communicate via one or more Access Networks (AN), e.g. RAN, to one or more CNs. The UE 120 may e.g. be a wireless device (WD), a mobile station, a non-access point (non-AP) STA, a STA, and/or a wireless terminal. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The RAN comprises a set of radio network nodes, such as radio network nodes 110, 111 each providing radio coverage over one or more geographical areas, such as a cell 130, 131 of a radio access technology (RAT), such as LTE, UMTS, Wi-Fi or similar. The radio network node 110, 111 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 110, 111 depending e.g. on the first radio access technology and terminology used.

The CN further comprises a core network node 140 which is configured to communicate with the radio network nodes 110, 111, via e.g. an 51 interface. The core network node may e.g. be a Mobile Switching Centre (MSC), a Mobility Management Entity (MME), an Operations & Management (O&M) node, an Operation, Administration and Maintenance (OAM) node, an Operations Support Systems (OSS) node and/or a Self-Organizing Network (SON) node. The core network node 140 may further be a distributed node comprised in a cloud 141.

The UE 120 is located in the cell 130 of the network node 110, which is referred to as the serving cell, whereas the cell 131 of the network nodes 111 are referred to as neighboring cells. Although, the network node 110 in FIG. 4 is only depicted providing a serving cell 130, the network node 110 may further provide one or more neighboring cells 131 to the serving cell 130.

The communications network 100 may further comprise a non-legitimate device 150. The radio network nodes 110, 111 and the core network node are all associated with a first domain of the communications network 100. The first domain is a part of the network which is operated by a provider with which a user or a UE 120 has a service agreement. Network nodes operated by a roaming partner of the provider are also associated with the first domain. The first domain of the communications network 100 may herein also be referred to as the legitimate network. The non-legitimate device 150 is a device associated with a second domain of the communications network 100, i.e. a domain not operated by the provider or a roaming partner. The non-legitimate device 150 impersonates a network node 110, 111, 140 of the first domain of the communications network 100 in order to try to lure the UE 120 to connect to the device. The second domain of the communications network 100 may herein be referred to as a non-legitimate network.

The UE 120 may further be configured to communicate over a plurality of different RATs, such as LTE, UMTS, Wi-Fi or similar.

It should also be noted that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB, GSM network, any 3GPP cellular network or any cellular network or system, may also benefit from exploiting the ideas covered within this disclosure.

It should also be noted that terminology such as network node and network device should be considering non-limiting and does in particular not imply a certain hierarchical relation between the two; in general "network node" may be considered as a first device, or device 1, and "network device" may be considered as a second device, or device 2, and these two devices may communicate with each other over a radio channel. The embodiments herein further focus on wireless transmissions in the downlink, however the embodiments herein are equally applicable in the uplink.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

A missed call generally works as follows. The UE 120 receives a call. Then, the UE 120 may notify the user, e.g., by turning on the screen and displaying the caller's number, and/or by vibrating the UE device, and/or by ringing a call-tone. The user of the UE 120 may not answer the call for whatever reason. In case of the Wangiri fraud, the user generally does not have a chance to answer the call because the caller terminates the call after a single signaling, such as a ring or a vibration. In this case, the user may notice a missed call notification in the UE 120, such as e.g., in a call history, and/or as a notification icon.

Figure 5A:
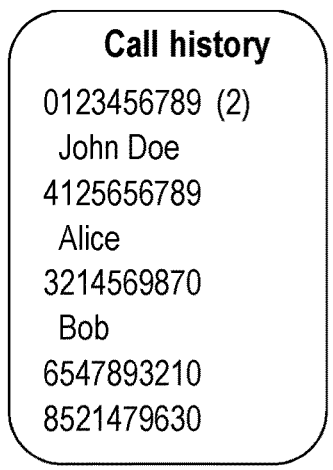
FIGS. 5A-5D illustrate some examples of how conventional missed call notifications may look like on a UE screen or display.
Figure 5B:
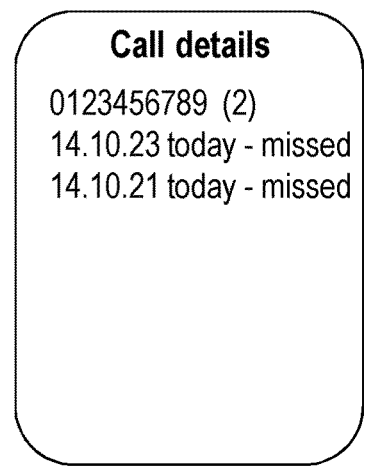
Figure 5C:
Figure 5D:
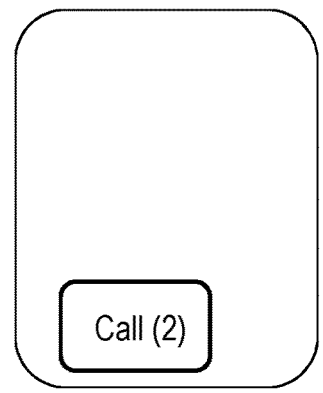

Some examples of how missed call notifications can be displayed on a UE screen 500 in a conventional manner are shown in FIGS. 5A-5D. In the example of FIG. 5A, the call history shows that there were two missed calls from the number 0123456789. The example in FIG. 5B shows a detailed view in which the user may see when the two missed calls of Example #1 were received. The example in FIG. 5C is another way of displaying missed calls as a notification bar. The example in FIG. 5D is yet another way of displaying that there were two missed calls along with a call icon.

According to the embodiments herein, properties of a missed phone call, such as e.g. the number of "rings" of the call before it is terminated, may be used to determine whether the missed call originates from a fraudulent device, such as e.g. a false base station, e.g. when the missed call is related to the Wangiri fraud. An analysis of the number of "rings" for each missed call at the UE 120 enables the UE 120 and/or a user of the UE 120 in making a better judgement of whether or not the missed call came from a fraudulent device executing a fraud such as the Wangiri fraud. The term rings may herein be interpreted as the signaling or signals that the user of the UE 120 receives when receiving a call, or the signaling that the network sends out to the UE 120 when the call is sent to the UE 120.

When the UE 120 receives a call, the UE 120 generally produces repetitive signals such as audible calling tones and/or repetitive vibrations. These sorts of repetitive signals or notifications are herein referred to as "rings". These may in modern IP-based multimedia services also be referred to as announcements, see e.g. 3GPP TS 24.628 v. 15.0.0. However, modern UEs may also allow playing a continuous "ring melody" or other sound instead of repetitive calling tone. An example of a ring melody may e.g. be a song. A greater number of rings or a longer duration of the ring melody means that the caller has waited a longer time for the callee to answer the call. Conversely, a fewer number of rings or a shorter duration of the ring melody means that the caller waited a shorter amount of time for the callee to answer the call.

In the following examples, the description and the illustrations are based on the number of rings produced by the UE 120. It should however be appreciated that the same examples and features can be applied with respect to the duration of a ring melody. Some examples of a number of rings may e.g. be "1 RING" or "2 RINGs". Other examples of a duration of ring melody may e.g. be "less than 1 second" or "5 seconds". In the following, the duration of a missed incoming call may be measured and denoted either as the number of rings or as the duration of a more or less continuous ring melody, until the call is ended before it has been answered.

The examples according to the known solutions disclosed in FIGS. 5A-5D all show the telephone number of the missed call, however none of them provides any information whatsoever about its duration, e.g. the number of rings made for each missed call.

An example of how a method could be performed by the UE 120 in the communications network 100, for detecting that the UE 120 has received a potentially fraudulent missed call, will now be described with reference to a flowchart depicted in FIG. 6. The potentially fraudulent missed call may e.g. be received from a non-legitimate device 150, which is a device associated with the second domain of the communications network 100, which device impersonates a network node 110, 111, 140 of the first domain of the communications network 100. However, the missed call may be received from any calling device or telephone which could be any type of communication device, legitimate or non-legitimate, and the solution is not limited to any particular calling device.

The method may comprise the following actions, which actions may be taken in any suitable order. Dashed lines of a box in FIG. 6 indicate that this action may be optional.

Action 6010

The UE 120 receives a missed call from a device which call is ended before a user of the UE has answered the incoming call, hence a missed call. The calling device may e.g. be a genuine device, such as e.g. the genuine network node 110, or a non-genuine device, such as e.g. a false base station. Receiving a missed call shall herein be interpreted as the UE 120 receiving a call which is ended by the caller before the user of the UE 120, i.e. the callee or the receiver of the call, manages to answer the incoming call. The caller may thus interrupt the calling operation by simply hanging up the calling device which may be done manually by a human or automatically by the device itself after a short duration to make sure the callee has not enough time to answer the call.

The missed call may be received from a device, such as another UE 120, a network node 110, 111, 140 or from a non-legitimate device 150, such as e.g. a false base station.

Action 6020

The UE 120 determines a duration of the missed call. The duration of the missed call may be determined by measuring a start and an end of the missed call, by counting the number of signalings, such as rings and/or vibrations, and/or by measuring a duration of a ring melody.

Action 6030

The UE 120 may further determine, based on the duration of the missed call, that the missed call is potentially fraudulent. A fraudulent call may e.g. be received from a non-legitimate device 150. The missed call may be determined to be potentially fraudulent when the duration of the missed call is below or equal to a predetermined threshold. The predetermined threshold may be a number of rings, e.g. just one ring, or a duration of a ring melody, depending on how the UE 120 operates. When the UE 120 is configured to play a number of repetitive calling tones, which may also be referred to as ring tones, the predetermined threshold may thus be a number of rings, i.e. a number of ring tones. When the UE 120 is configured to play a continuous ring melody, then the predetermined threshold may be the duration of the ring melody. The threshold may e.g. be two rings or one ring. When the threshold is the duration of the ring melody, the threshold may e.g. be five seconds, or preferably one second. A potentially fraudulent missed call may also be referred to as a suspicious missed call. The potentially fraudulent missed call may be determined to be fraudulent by taking further information into account, such as e.g. if the calling number corresponding to the missed call is known, if the calling number is detected to be a premium number, or if the missed call originates from a foreign country, into account for the determination of the call being fraudulent.

The UE 120 may e.g. determine that the missed call is not a fraudulent call when the telephone number of the caller is stored in the UE, such as e.g. in the user's contact book, regardless of the missed call's duration. When the telephone number is determined not to be fraudulent, the UE 120 may not show any indicator of the number of rings or duration of the ring melody.

Furthermore, depending on the country numbering plan for premium services, the UE 120 may be able to distinguish normal local calls from premium ones and not flag the number of rings or the duration of the ring melody for normal calls with a duration of one ring or a short duration of the ring melody.

Furthermore, calls from foreign countries or from unknown sources may be classified by the UE 120 as being suspicious, and/or determined to be potentially fraudulent.

Action 6040

The UE 120 indicates the duration of the missed call, e.g. to the user of the UE 120. The indication may e.g. comprise showing a symbol in a human interface of the UE 120, such as e.g. on a display or screen of the UE 120, or may alternatively or additionally comprise playing an acoustic or audible signal.

When the UE 120 has determined that the missed call is potentially fraudulent, the UE may indicate, e.g. to the user of the UE 120 that the call is likely to have been received from a fraudulent device, such as the non-legitimate device 150.

Figure 7A:
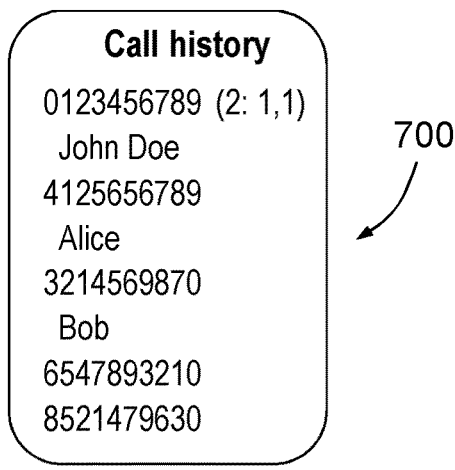
FIGS. 7A-7D illustrate some examples of enhanced missed call notifications, according to some embodiments herein.
Figure 7B:
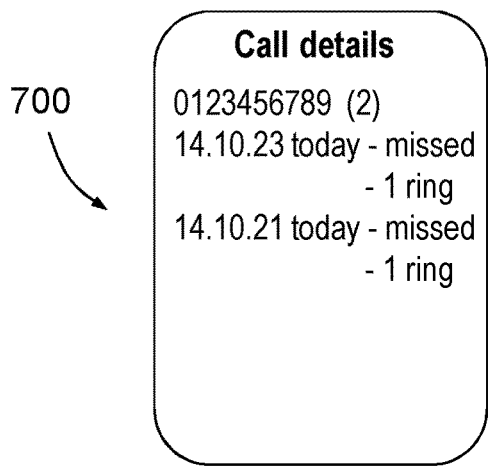
Figure 7C:
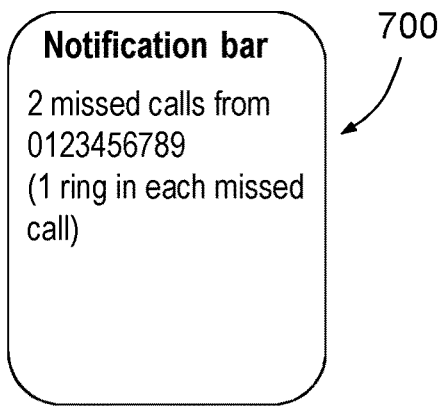
Figure 7D:
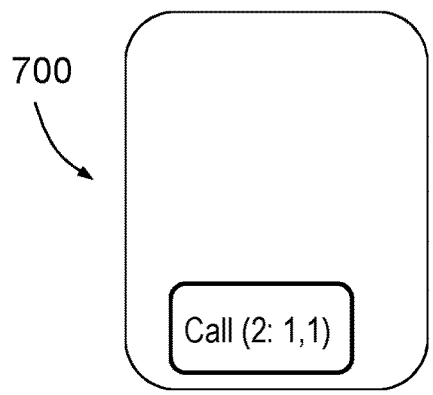
Figure 8A:
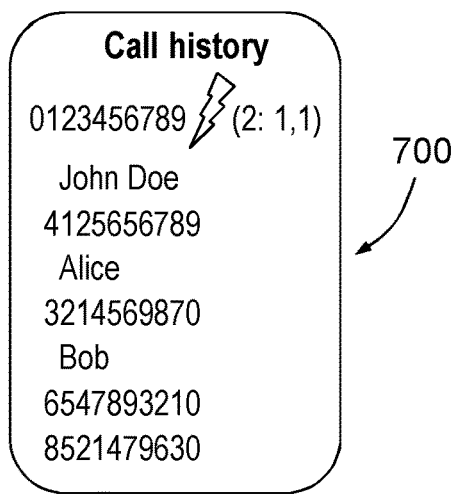
FIGS. 8A-8D illustrate further examples of enhanced missed call notifications, according to some further embodiments herein.
Figure 8B:
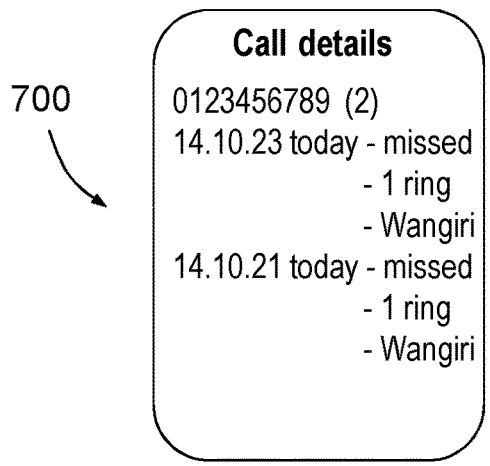
Figure 8C:
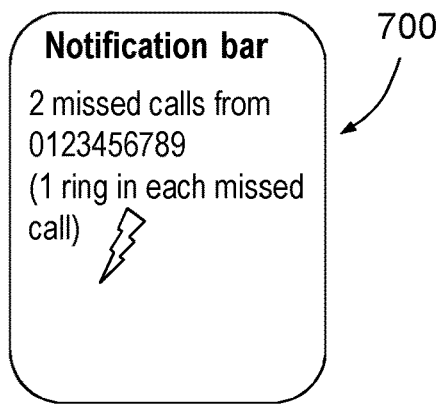
Figure 8D:
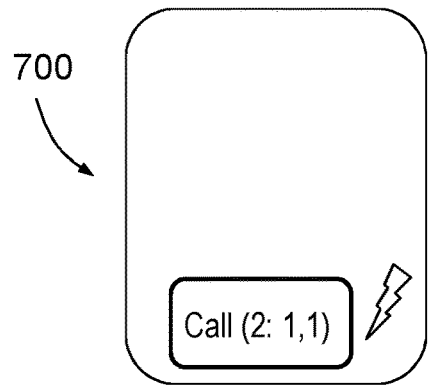

Some examples of how action 6040 could be executed in practice will now be described. FIGS. 7A-7D disclose some illustrative but non-limiting examples of how a missed call notification as shown in FIGS. 5A-5D may be enriched with an indication of the missed call's duration on a display or screen 700 of the UE 120, in this case comprising the number of rings. In FIG. 7A corresponding to FIG. 5A enriched, the call history shows that there were two missed calls from the number 0123456789 and that there was one ring made in the first missed call, and one ring made in the second missed call. FIG. 7B corresponding to FIG. 5B enriched shows a detailed view where the UE 120 provides information to the user regarding when those two missed calls were received along with the fact that each missed call had only one ring. FIG. 7C corresponding to FIG. 5C enriched is another potential way for the UE 120 to provide information to the user by displaying the missed calls as a notification bar where the number of rings is provided. FIG. 7D corresponding to FIG. 5D enriched is yet another way of displaying that there were two missed calls and one ring in each missed call along with a call icon. Similar information may also be provided by the UE 120 based on the case of short duration of a ring melody.

By providing missed call notifications enriched with the number of rings as shown in FIGS. 7A-7D enables the user of the UE 120 in making a better judgment of whether or not missed calls have come from non-legitimate or fraudster-controlled devices, which are performing e.g. the Wangiri fraud. It is so because, generally, missed calls from unknown numbers with short duration, e.g. of only one ring, can be associated with the Wangiri fraud. A similar enrichment may also be achieved based on the duration of the ring melody.

The UE 120 may also analyze the number of rings and further enrich the missed call notification. FIGS. 8A-8D show some further examples of how the missed call notifications of FIGS. 7A-7D, respectively, may be further enriched by displaying an icon, herein exemplified by a lightning, or an indicative text, herein exemplified with the word WANGIRI. A similar enrichment may be achieved by analyzing the duration of the ring melody.

Action 6050

Returning to FIG. 6, the UE 120 may, in addition to action 6040, also block a call to be made from the UE 120 to the number corresponding to the potentially fraudulent missed call. In this embodiment, a "call" should be understood as any type of communication to said number, such as a voice call, a video call, or an SMS or similar text message. The UE 120 may e.g. block a call to be made from the UE 120 to the non-legitimate device 150 or an incoming call from the non-legitimate device 150 to the UE 120. If the user tries to call or text back to the missed number, the UE 120 may refrain from transmit the call and may instead display a notification indicating that the number that is called or texted may potentially be related to a non-legitimate device or may be fraudulent. The UE 120 may also provide the option of allowing the user of the UE 120 to accept that the call to the missed number may be a call to a non-legitimate device in order to allow the blocked call to be transmitted. This may e.g. be beneficial if the UE 120 wrongfully blocks a number which the user of the UE 120 can recognize as being a legitimate number.

In some embodiments, the UE 120 or an application in the UE 120 may block the call from being made to the non-legitimate device by e.g. removing or omitting the suspected Wangiri fraud calls from missed call notification, or by showing the notification only after the number of rings is more than the predetermined threshold, such as e.g. more than one ring or other configured value such as e.g. two or three rings. The action of blocking an outgoing call to the number of a potentially fraudulent missed call may be configured as default by a manufacturer of the UE 120 or by an app developer, or may be configured by the user of the UE 120. The user of the UE 120 may e.g. select a missed number which the UE 120 shall automatically block for future incoming calls.

In some further embodiments, a call may be marked as fraudulent and may be stored by the UE 120 or an app in the UE 120 in order to block such calls in the future and also to inform the corresponding network service for further fraud analysis corresponding prevention measures. The user may e.g. mark a certain number as fraudulent and the UE may store the number marked by the user and may, based on these stored numbers, block incoming calls from and/or outgoing calls to the stored numbers.

Action 6060

The UE 120 may further transmit, to the network node 110, 111, 140 of the first domain of the communications network 100, information that the missed call is potentially fraudulent which information may further comprise the number corresponding to the missed call, i.e. the calling number, and the duration of the missed call. The UE 120 may further transmit, to the network node 110 of the first domain of the communications network 100, information that the call is received from a non-legitimate device 150. Such information may be used by the network node 110 to take various actions such as e.g. triggering an alarm in e.g. a network operation center. Triggering the alarm may raise an alert level. The network node 110, 111, 140 may, based on the information received from the UE 120, raise a warning message providing an alert on a possible presence of a non-legitimate device, such as e.g. a false or faked base station, in the area, which warning message may be sent to the UE 120 or to a second receiver, such as e.g. the network provider and/or the police. The network node 110, 111, 140 may e.g. send the warning message or trigger the alarm by means of an indicating unit comprised in the network node 110, 111, 140. The alerting may e.g. be performed via email and/or SMS. Once the false base stations are detected, they may be reported to suitable authorities, located, e.g., by means of triangulation, and removed. The reporting of false base stations may e.g. be performed by a reporting unit, and/or a transmitting unit comprised in the network node 110, 111, 140.

The fraudster may try to bypass the solution according to the embodiments herein by ringing for a longer time, such as e.g. multiple rings, to exceed the above-described threshold. It should however be appreciated that in such case, the original attack is mitigated because the whole point of the attack was to call very shortly, e.g. place just one ring, so that the user does not have enough time to pick up the call.

The fraudster may also terminate the call as soon as the user starts answering. It should however be appreciated that in such case, the original attack is also mitigated because there is now a cost incurred for the caller. The user is in this case also likely to suspect that the interrupted call was meant to trick and therefore not call back.

In the above examples, one ring may be set as a threshold for determining the occurrence of a fraudulent call e.g. executing the Wangiri fraud. It should however be appreciated that the threshold may be configurable or may be different than one ring. Similarly, a configurable threshold may also be applied to the duration of the ring melody. The threshold may e.g. be "1 second", or "less than 5 seconds".

In the above examples, the number of rings are determined in association to missed calls. It should however be appreciated that the number of rings may also be associated with all the calls made to the UE 120, so that the UE 120 or the user of the UE 120 can check the history or pattern of rings. Similarly, the duration of the ring melody may also be associated with all calls in order to provide a call pattern for all calls made to the UE 120.

The embodiments herein for identifying and indicating suspicious calls based on the number of rings and/or the duration of the ring melody may be utilized also for cases when the call is not a fraudulent call, as follows:

The UE 120 may for example, determine that the missed call is not a fraudulent call when the telephone number of the caller is stored on the UE, such as e.g. in the user's contact book. When the telephone number is determined not to be fraudulent, the UE 120 may not show the indicator of the number of rings or duration of the ring melody.

Also, depending on the country numbering plan for premium services, the solution according to the embodiments herein may discriminate or distinguish normal local calls from premium service calls and not indicate the number of rings or the duration of the ring melody for normal calls with one ring or a short duration of the ring melody.

Furthermore, calls from foreign countries or from unknown sources may be classified by the UE 120 as being suspicious, and/or determined to be potentially fraudulent.

In some embodiments herein, the network, such as a network node, may determine the duration of the call, e.g. by counting the number of rings, e.g., network announcement according to 3GPP TS 24.628 v. 15.0.0, classify, which may herein also be referred to as determine the missed call as potential Wangiri, and may inform the UE 120 that is handling the calls to display the Wangiri warning according to any of the examples provided above. A potential technical difficulty in doing so may however be the following. It may be that the number of rings which the caller hears on the phone doesn't necessarily correspond to what the UE signals to the network. The network node may e.g. determine the duration of the call by means of a determining unit comprised in the network node. The informing of the UE may e.g. be performed by means of an indicating unit and/or a transmitting unit comprised in the network node 110, 111, 140.

The embodiments herein aim to provide a solution that can be used to avoid the damage caused by the Wangiri fraud. The embodiments herein provide a device-based technique, i.e. implemented in the UE, for determining if a missed call may be fraudulent. The embodiments herein enables the UE and/or the user of the UE to determine whether or not a missed call is related to the Wangiri fraud.

The embodiments herein provide a simple and yet effective solution for mitigating the damage caused by the Wangiri fraud. The simplicity of implementation is due to the fact that there is no administrative or bureaucratic process involved, no change is required in the UE to network protocols, no change in intra or inter network protocols, no need for analytics infrastructure in network, and no requirement to collect data for analytics. The effectiveness is due to the fact that the damage may be prevented before it actually occurs, rather than being detected later when the damage has occurred.

The embodiments herein uses properties of missed calls at the UE to enable both a UE and/or a user of the UE to determine whether or not the missed calls belong to, which may also be referred to as being related to, the Wangiri fraud or similar fraudulent behavior.

The properties of the missed calls may for example comprise: a number of rings, a duration of the ring melody signal, and/or a number of vibrations.

The embodiments herein provide a device-based solution, meaning that the UEs implement the method according to the embodiments herein.

This solution according to the embodiments herein allow detection of possible fraudulent, so-called Wangiri, calls by determining the call's duration, e.g. by counting the number of rings, before the call is terminated by the caller and a non-established call is missed. The wording missed call may herein be interchangeably used with dropped call, since a caller dropping the call before the callee is able to answer the call leads to the callee receiving a missed call on the callee's UE. In an embodiment, a visual indicator may be displayed when such a call has been identified by main feature being number of rings equal to one and additional feature based on a caller number reputation.

Figure 9:
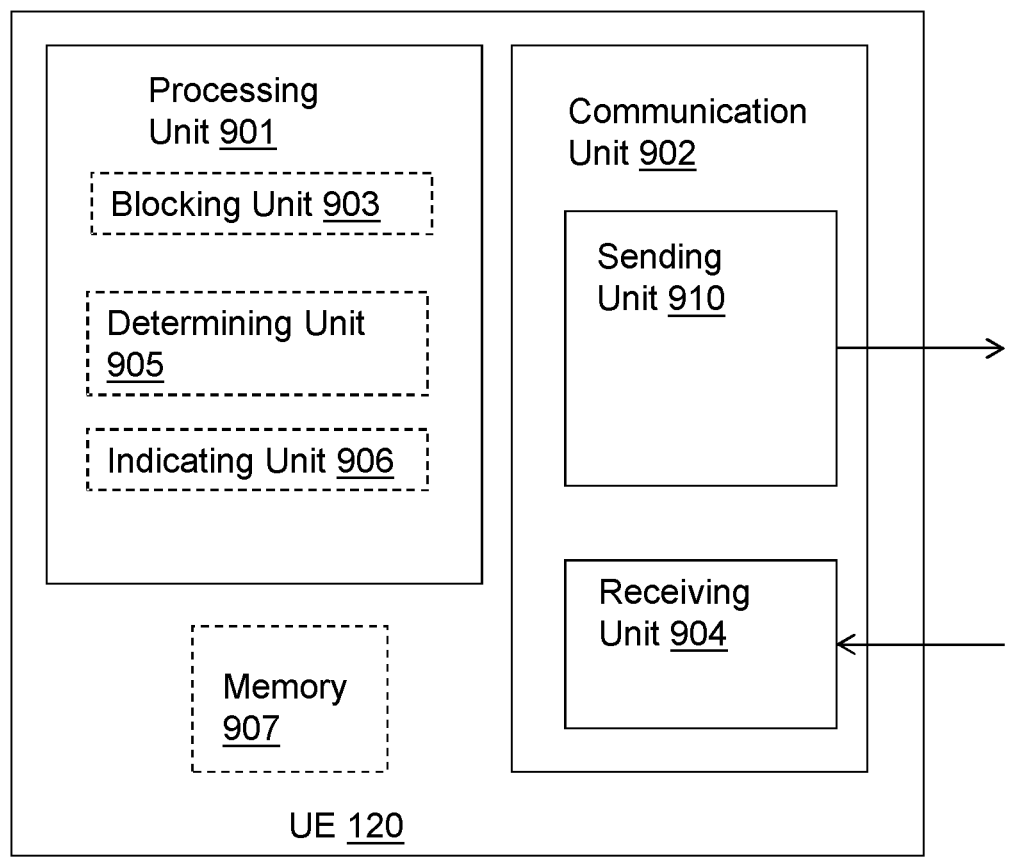
FIG. 9 is a schematic block diagram illustrating a UE, according to further embodiments herein.
Figure 9:
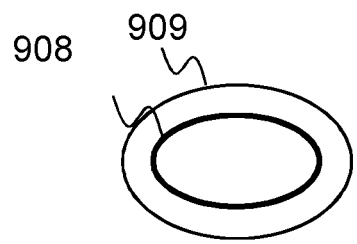

To perform the method actions for detecting that the UE 120 associated with the first domain of the communications network 100 has been communicating with a non-legitimate device 150, described above in relation to FIG. 6, the UE 120 may comprise the following arrangement as depicted in FIG. 9.

The block diagram in FIG. 9 illustrates a detailed but non-limiting example of how a UE 120 may be structured to bring about the above-described solution and embodiments thereof. In this figure, the UE 120 may be configured to operate according to any of the examples and embodiments of employing the solution as described herein, where appropriate. The UE 120 is shown to comprise a processing unit 901, a memory 907 and a communication unit 902 with suitable equipment for transmitting and receiving information and messages in the manner described herein.

The communication unit 902 in the UE 120 thus comprises equipment such as a sending unit 910 and a receiving unit 904, being configured for communication using a suitable protocol for the communication depending on the implementation. The solution is however not limited to any specific types of UEs, messages or protocols.

The UE 120 is, e.g. by means of units, modules or the like, configured or arranged to perform at least some of the actions of the flow chart in FIG. 6 and as follows.

The UE 120 may be adapted for communicating with a communications network via network devices therein, such as network nodes 110, 111, 140 or other UEs.

The UE 120 is configured to, e.g. by means of the communication unit 902 and/or the processing unit 901 being configured to, receive a missed call.

The UE 120 is further configured to, e.g. by means of the determining unit 905 and/or the processing unit 901 being configured to, determine the duration of the missed call.

The UE 120 may further be configured to, e.g. by means of the determining unit 905 and/or the processing unit 901 being configured to, determine, based on a duration of the missed call, that the missed call is potentially fraudulent.

The UE 120 may further be configured to, e.g. by means of the determining unit 905 and/or the processing unit 901 being configured to, determine, based on said duration of the missed call, that the missed call is received from a non-legitimate device.

The UE 120 may further be configured to, e.g. by means of the determining unit 905 and/or the processing unit 901 being configured to, determine that the received call is fraudulent and/or received from a non-legitimate device 150 when the duration of the received call is below a predetermined threshold. The predetermined threshold may e.g. be the number of rings or the duration of the ring melody.

The UE 120 is further configured to, e.g. by means of an indicating unit 906 and/or the processing unit 901 being configured to, indicate, e.g. to a user of the UE 120, that the call is fraudulent and/or was received from a non-legitimate device 150. The indication unit may e.g. comprise a display or screen of the UE 120.

The UE 120 may further be configured to, e.g. by means of a blocking unit 903 and/or the processing unit 901 being configured to, block a call to be made from the UE 120 to the number of the potentially fraudulent missed call, such as e.g. to the non-legitimate device 150.

The UE 120 may further be configured to, e.g. by means of the communication unit 902 and/or a sending unit 910 being configured to, transmit, to a network node 110 of the first domain of the communications network 100, information that the missed call is potentially fraudulent and/or was received from the non-legitimate device 150 which information may further comprise the calling number corresponding to the missed call and the duration of the missed call.

It should be noted that while FIG. 9 illustrates various functional units in the UE 120, the skilled person should be able to implement these functional units in practice using suitable software and hardware equipment. Thus, the solution is generally not limited to the shown structure of the UE 120, and the functional units therein may be configured to operate according to any of the features, examples and embodiments described in this disclosure, where appropriate.

Those skilled in the art will also appreciate that the blocking unit 903, the determining unit 905 and the indicating unit 906 described above may refer to a combination of analog and digital circuits, and/or one or more processors configured with software and/or firmware, e.g. stored in the memory 907, that when executed by the one or more processors such as the processing unit 901 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 6:
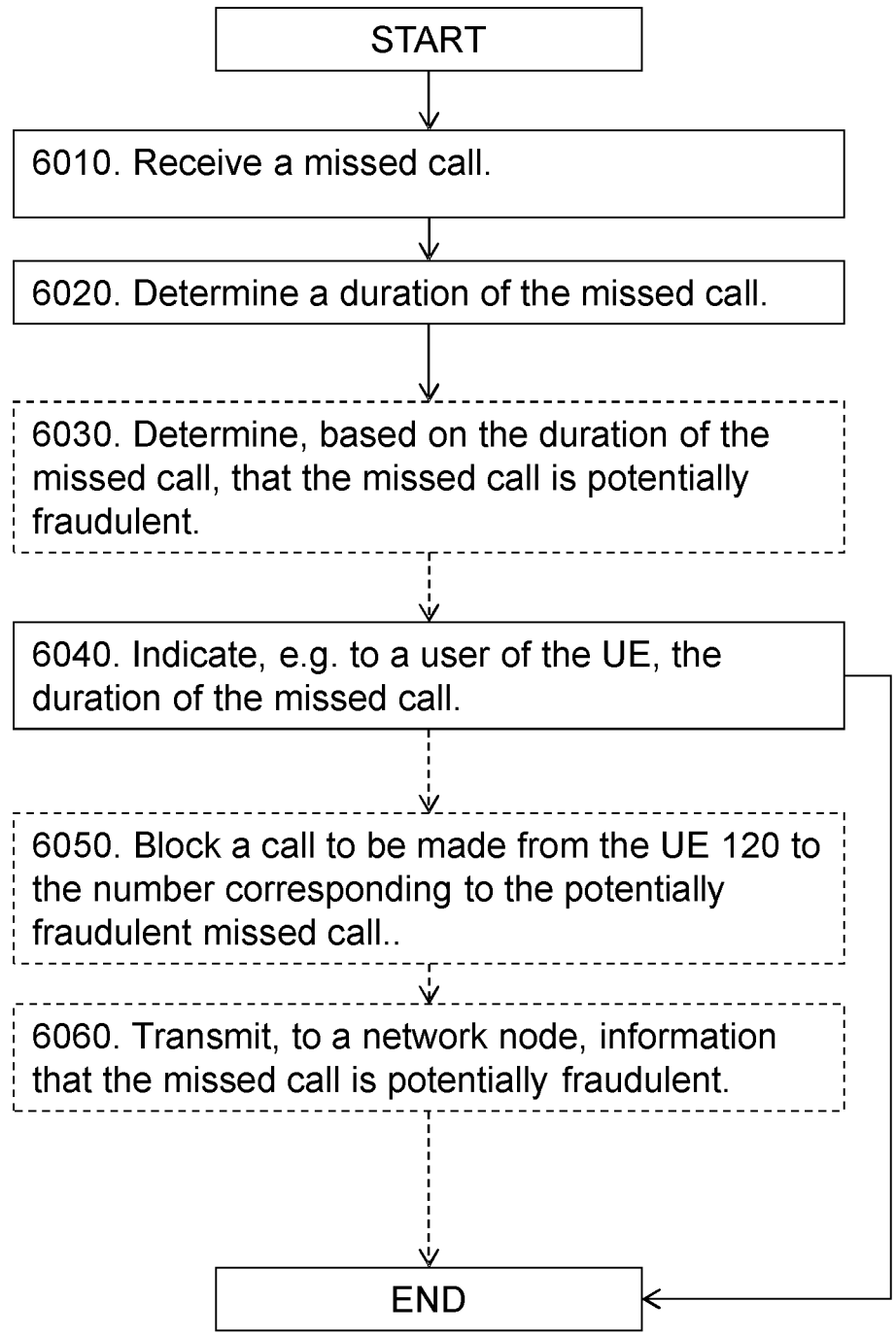
FIG. 6 is a flow chart illustrating a method performed by a UE, according to some embodiments herein.
Figure 10:
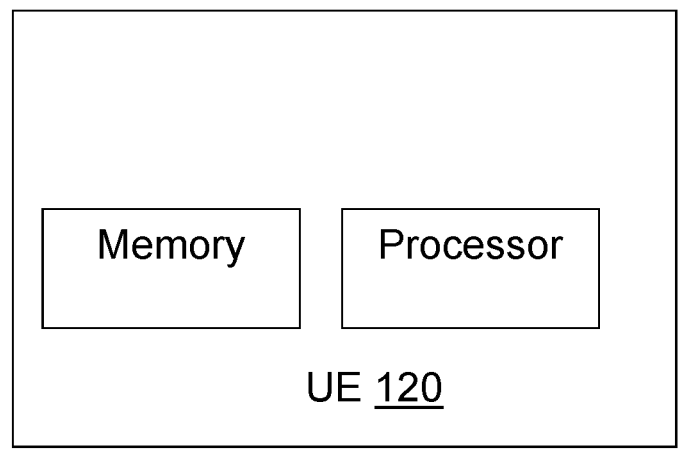
FIG. 10 is a schematic block diagram illustrating the UE according to further embodiments herein.
Figure 10:
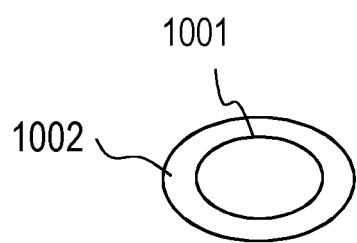

The embodiments herein for detecting that the UE 120 has received a potentially fraudulent missed call may be implemented through a respective processor or one or more processors of a processing circuitry in the UE 120 as depicted in FIG. 10, which processing circuitry is configured to perform the method actions according to FIG. 6 and the embodiments described above for the UE 120.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as e.g. a memory stick. The computer program code may furthermore be provided as pure program code on a server and downloaded to the UE 120.

The UE 120 may further comprise a memory 907. The memory may comprise one or more memory units to be used to store data on, such as the numbers determined to be related to a non-legitimate device, software, patches, system information (SI), configurations, diagnostic data, performance data and/or applications to perform the methods disclosed herein when being executed, and similar.

The method according to the embodiments described herein for the UE 120 may be implemented by means of e.g. a computer program product 909, 1001 or a computer program, comprising instructions, i.e., software code portions, which, when executed on at least one processor, cause at least one processor to carry out the actions described herein, as performed by the UE 120. The computer program product 908, 1001 may be stored on a computer-readable storage medium 908, 1002, e.g. a disc or similar. The computer-readable storage medium 908, 1002, having stored thereon the computer program, may comprise instructions which, when executed on at least one processor, cause the at least one processor to carry out the actions described herein, as performed by the UE 120. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a UE.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

When using the word "comprise" or "comprising" it shall be interpreted as non-limiting, i.e. meaning "consist at least of".

While the solution has been described with reference to specific exemplifying embodiments, the description is generally only intended to illustrate the inventive concept and should not be taken as limiting the scope of the solution. For example, the terms "User Equipment, UE", "communications network", "missed call", "ring" and "number of rings" have been used throughout this disclosure, although any other corresponding entities, functions, and/or parameters could also be used having the features and characteristics described here. The solution is defined by the appended claims.

The invention claimed is:

1. A method performed by a user equipment (UE) in a communications network for detecting that the UE has received a fraudulent incoming call, the method comprising:

receiving, at the UE, an incoming call, wherein the incoming call is determined to be a missed call because the incoming call is determined to have ended before a user of the UE answered the incoming call and wherein the missed call has a duration;

determining, by the UE, the duration of the missed call;

indicating the duration of the missed call to a user of the UE; and transmitting to a network node a message comprising call duration information indicating the duration of the missed call, wherein the message indicates the missed call is potentially fraudulent.

2. The method of claim 1, wherein the duration of the missed call is determined by measuring a start and an end of the missed call, by counting a number of rings, and/or by measuring a duration of a ring melody.

3. The method of claim 1, wherein the method further comprises:

determining, based on the duration of the missed call, that the missed call is potentially fraudulent, wherein the missed call is determined to be potentially fraudulent when the duration of the missed call is below or equal to a predetermined threshold.

4. The method of claim 3, wherein the predetermined threshold is a number of rings and/or a duration of a ring melody.

5. The method of claim 3, wherein the step of indicating further comprises indicating that the missed call is potentially fraudulent.

6. The method of claim 3, wherein the method further comprises:

blocking a call to be made from the UE to a number corresponding to the potentially fraudulent missed call.

7. A user equipment (UE) in a communications network for detecting that the UE has received a fraudulent incoming call which is determined to be a missed call because it is determined that the incoming call ended before a user of the UE has answered the incoming call, wherein the missed call has a duration, the UE comprising:

memory; and processing circuitry coupled to the memory, wherein the UE is configured to:

determine the duration of the missed call;

indicate the duration of the missed call; and transmit, to a network node, a message comprising call duration information indicating the duration of the missed call, wherein the message indicates the missed call is potentially fraudulent.

8. The UE of claim 7, wherein the UE is configured to determine the duration of the missed call by measuring a start and an end of the missed call, by counting a number of rings, and/or by measuring a duration of a ring melody.

9. The UE of claim 7, wherein the UE further is configured to:

determine, based on the duration of the missed call, that the missed call is potentially fraudulent, wherein the missed call is determined to be potentially fraudulent when the duration of the missed call is below or equal to a predetermined threshold.

10. The UW of claim 9, wherein the predetermined threshold is a number of rings and/or a duration of a ring melody.

11. The UE of claim 9, wherein the UE further is configured to indicate that the missed call is potentially fraudulent.

12. The UE of claim 9, wherein the UE is further configured to:

block a call to be made from the UE to a number corresponding to the number corresponding to the potentially fraudulent missed call.

13. A computer program product comprising a non-transitory computer readable medium storing instructions, which when executed by a processor, causes the processor to perform the method of claim 1.

14. The method of claim 1, wherein the method further comprises:

detecting a number corresponding to the missed call is a premium number and/or the missed call originated in a foreign country; and based on the duration of the missed call and detecting the number corresponding to the missed call is a premium number and/or the missed call originated in a foreign country, determining that the missed call is potentially fraudulent.

15. The method of claim 1, wherein the method further comprises:

determining that the duration of the missed call is less than a threshold; and as a result of determining that the duration of the missed call is less than a threshold, refraining from including the missed call in miss call notifications.

\* \* \* \* \*